(12) United States Patent
Pulice et al.

(10) Patent No.: US 9,845,121 B2
(45) Date of Patent: Dec. 19, 2017

(54) SPARE TIRE ANTI-THEFT DEVICE

(71) Applicant: Spare-tite, Inc., Darien, IL (US)

(72) Inventors: Peter Pulice, Darien, IL (US); Eric Kowalik, Chicago, IL (US); Thomas William Buffington, Naperville, IL (US)

(73) Assignee: Spare-tite, Inc., Darien, IL (US)

( * ) Notice: Subject to any disclaimer, the term of this patent is extended or adjusted under 35 U.S.C. 154(b) by 0 days.

(21) Appl. No.: 14/973,550

(22) Filed: Dec. 17, 2015

(65) Prior Publication Data

US 2016/0176451 A1    Jun. 23, 2016

Related U.S. Application Data

(60) Provisional application No. 62/092,946, filed on Dec. 17, 2014.

(51) Int. Cl.
*B62D 43/00* (2006.01)

(52) U.S. Cl.
CPC .................................. *B62D 43/007* (2013.01)

(58) Field of Classification Search
CPC .... B62D 43/04; B62D 43/045; B62D 43/007; Y10T 70/5984; Y10T 70/40
USPC ...................................................... 224/42.23
See application file for complete search history.

(56) References Cited

U.S. PATENT DOCUMENTS

| | | | |
|---|---|---|---|
| 3,724,731 A * | 4/1973 | Potgieter | B62D 43/002 224/42.23 |
| 3,824,815 A | 7/1974 | Darling | |
| 4,042,158 A | 8/1977 | Cole | |
| 4,076,158 A | 2/1978 | Barr | |
| 4,111,344 A | 9/1978 | MacDonald | |
| 4,161,267 A | 7/1979 | Morrison, Jr. | |
| 4,225,066 A | 9/1980 | Barr | |
| 4,282,995 A | 8/1981 | Austin | |
| 4,294,088 A | 10/1981 | Barr | |
| 4,308,733 A | 1/1982 | Tampa | |
| 4,428,513 A * | 1/1984 | Delmastro | B62D 43/04 224/42.21 |
| 4,548,540 A | 10/1985 | Renfro | |
| 4,738,382 A * | 4/1988 | Natori | B62D 43/00 224/42.12 |
| 4,751,833 A | 6/1988 | Stumpf, Jr. | |
| 4,768,361 A | 9/1988 | Derman | |
| 4,873,851 A | 10/1989 | Arnett | |
| 4,878,366 A | 11/1989 | Cox | |
| 4,884,785 A | 12/1989 | Denman et al. | |
| 4,932,575 A | 6/1990 | Ware | |
| 4,988,023 A | 1/1991 | Heathcoat | |

(Continued)

FOREIGN PATENT DOCUMENTS

| | | |
|---|---|---|
| FR | 2806056 A1 | 9/2001 |
| GB | 2365395 A | 2/2002 |

*Primary Examiner* — Peter Helvey
(74) *Attorney, Agent, or Firm* — Banner & Witcoff, Ltd.

(57) ABSTRACT

An automobile spare tire anti-theft device is disclosed. In an embodiment, the device includes a cap and retainer assembly. The cap can be configured to cover a portion of the yoke and the cable coupling extending from the underside of the yoke, including for example an extension and spring assembly. The cap can be secured in place by engaging the cap retainer positioned on the opposite side of the hub of the rim. Example features of example embodiments of the cap and retainer are disclosed herein.

14 Claims, 19 Drawing Sheets

(56) References Cited

U.S. PATENT DOCUMENTS

| | | | |
|---|---|---|---|
| 5,077,995 A | 1/1992 | Appelbaum | |
| 5,199,287 A | 4/1993 | McClary | |
| 5,303,569 A | 4/1994 | Wright | |
| 5,330,313 A | 7/1994 | Easterwood | |
| 5,343,722 A | 9/1994 | Richardson | |
| D351,986 S | 11/1994 | Schotthoefer | |
| 5,475,995 A | 12/1995 | Livingston | |
| 5,477,711 A | 12/1995 | Oliveri | |
| 5,487,288 A | 1/1996 | Frantz | |
| 5,582,048 A | 12/1996 | Schotthoefer | |
| 5,638,710 A | 6/1997 | Howard, Jr. et al. | |
| 5,638,711 A | 6/1997 | Schotthoefer | |
| 5,718,411 A | 2/1998 | Baughan et al. | |
| D395,221 S | 6/1998 | Ryan et al. | |
| 5,758,523 A | 6/1998 | Kozlowski, Jr. et al. | |
| 5,791,171 A | 8/1998 | Kelley | |
| 5,802,895 A | 9/1998 | Osgood | |
| 5,823,413 A * | 10/1998 | Seltz | B62D 43/005 224/402 |
| 5,836,182 A | 11/1998 | Schotthoefer | |
| 5,924,314 A | 7/1999 | Cernansky | |
| 5,943,887 A | 8/1999 | Kozlowski, Jr. et al. | |
| 5,954,246 A | 9/1999 | Golovoy et al. | |
| 5,967,389 A | 10/1999 | Hutter et al. | |
| 5,975,498 A * | 11/1999 | Sauner | B62D 43/045 224/42.23 |
| D421,707 S | 3/2000 | Gregory | |
| 6,092,790 A | 7/2000 | Dobmeier et al. | |
| 6,142,449 A | 11/2000 | Aldridge et al. | |
| 6,164,100 A | 12/2000 | Schotthoefer | |
| 6,213,361 B1 | 4/2001 | Dexel | |
| 6,360,571 B1 | 3/2002 | O'Neal | |
| 6,370,927 B1 | 4/2002 | Gonzalez et al. | |
| 6,390,760 B1 | 5/2002 | Affer et al. | |
| 6,427,885 B1 | 8/2002 | Dexel | |
| 6,499,724 B1 | 12/2002 | Dobmeier et al. | |
| 6,505,488 B1 | 1/2003 | Princell | |
| 6,527,252 B2 | 3/2003 | Dziedzic | |
| 6,554,253 B1 | 4/2003 | Dobmeier et al. | |
| 6,561,489 B1 | 5/2003 | Wakefield | |
| 6,648,577 B2 * | 11/2003 | Obriot | B62D 43/04 224/42.23 |
| 6,749,094 B1 | 6/2004 | Dexel | |
| 6,871,841 B2 | 3/2005 | Brestelli et al. | |
| 7,195,231 B2 | 3/2007 | Murphy | |
| 7,413,171 B2 | 8/2008 | Reznar | |
| 7,487,952 B2 | 2/2009 | Murphy | |
| 7,487,953 B2 | 2/2009 | Sauner et al. | |
| 7,533,789 B1 | 5/2009 | Seely et al. | |
| 7,770,764 B2 * | 8/2010 | Rock | B62D 35/02 224/42.12 |
| 7,857,178 B2 | 12/2010 | Brown, Jr. | |
| 8,650,732 B2 * | 2/2014 | Huber | B60B 30/08 224/42.2 |
| 8,714,419 B2 * | 5/2014 | Pulice | B62D 43/007 224/42.12 |
| 2004/0265102 A1 | 12/2004 | Reznar | |
| 2006/0013679 A1 | 1/2006 | Posani | |
| 2006/0045689 A1 | 3/2006 | Voegeli et al. | |
| 2007/0241144 A1 * | 10/2007 | Rock | B62D 35/02 224/42.23 |
| 2010/0186467 A1 | 7/2010 | Reidl et al. | |

* cited by examiner

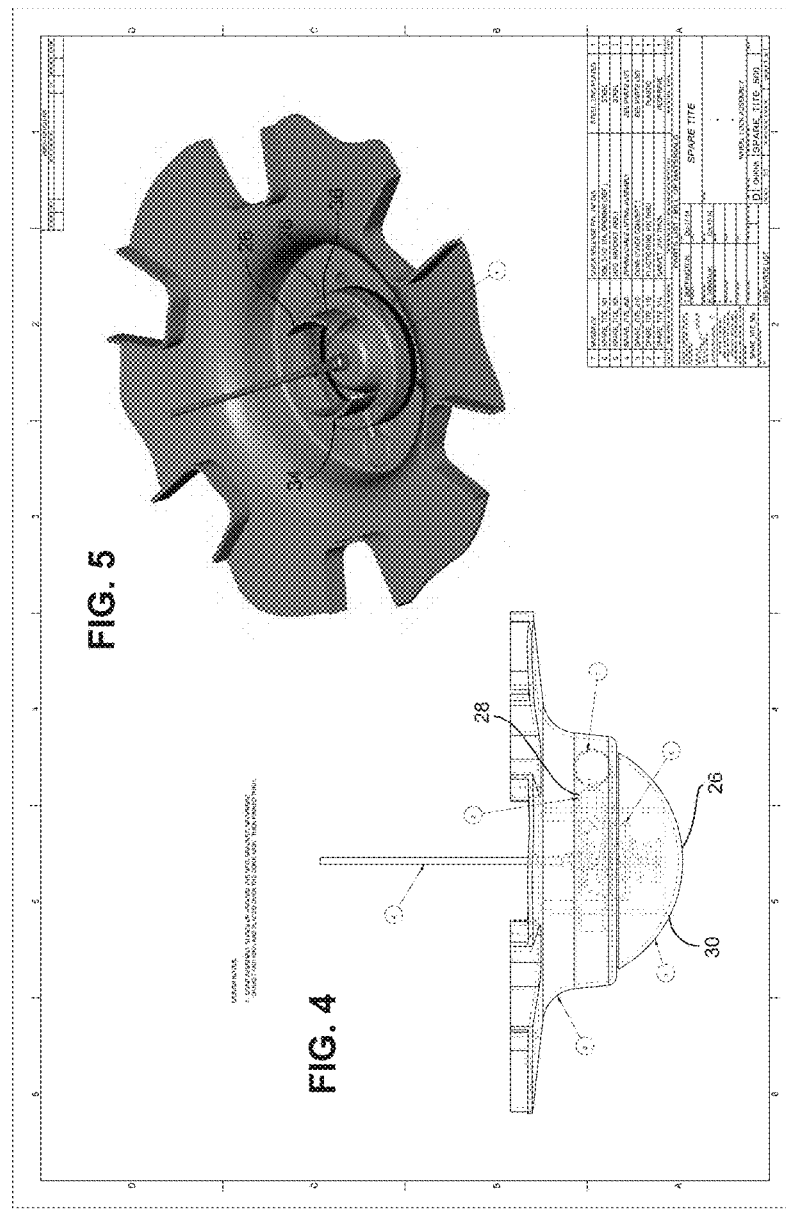

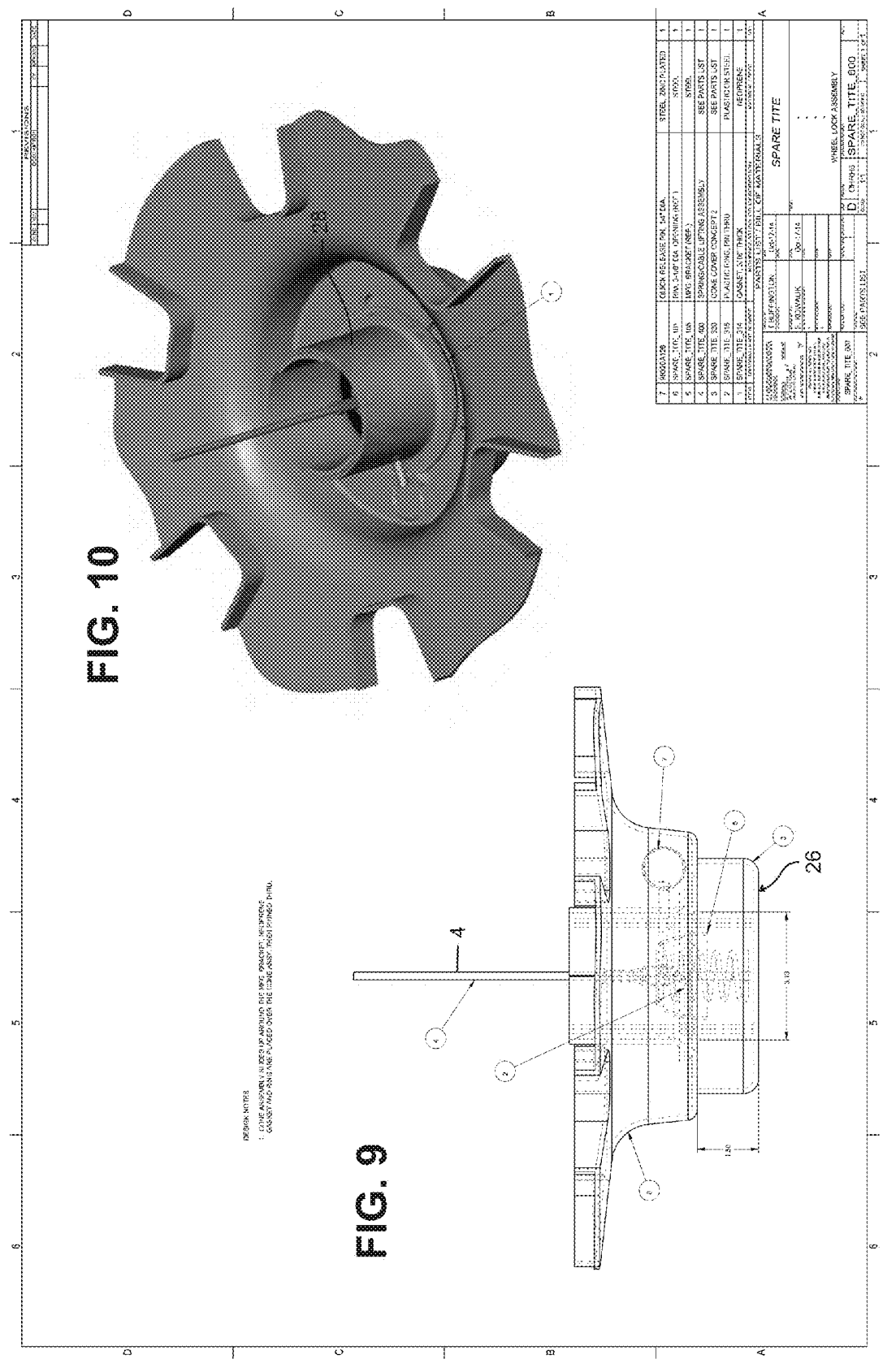

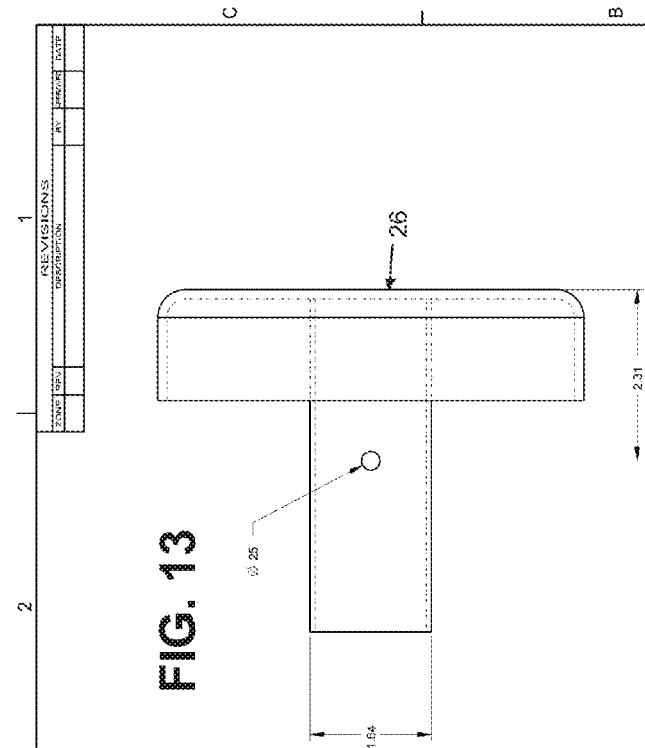
FIG. 13
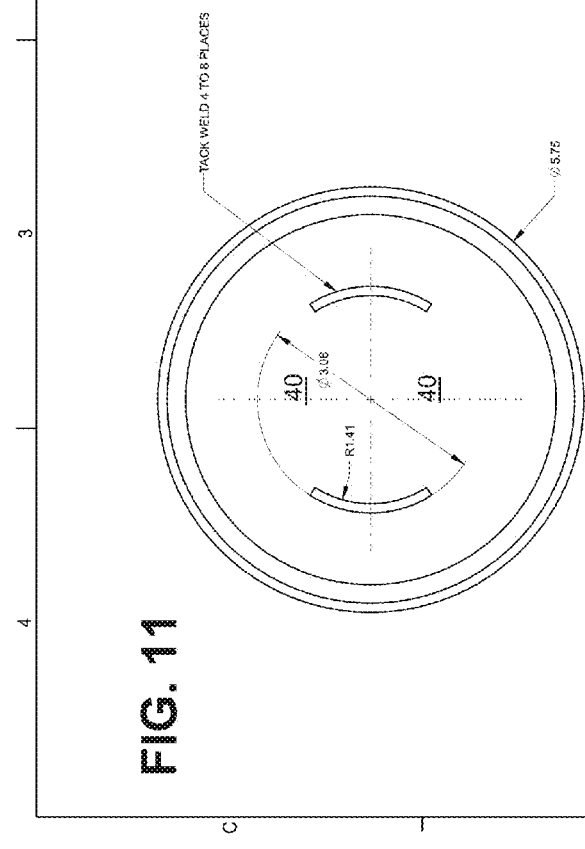
FIG. 11
FIG. 12
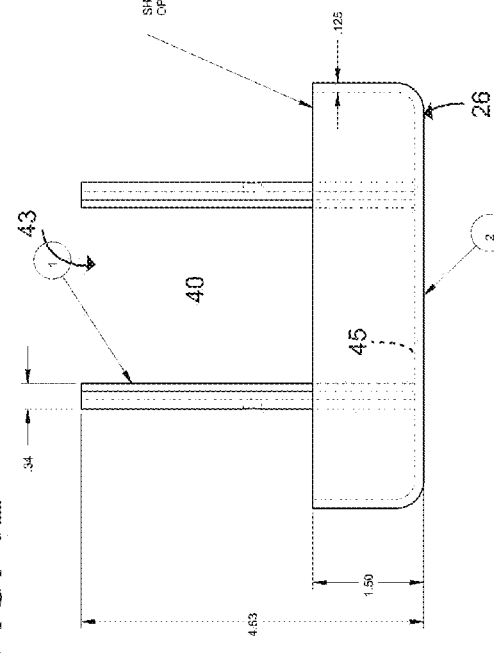

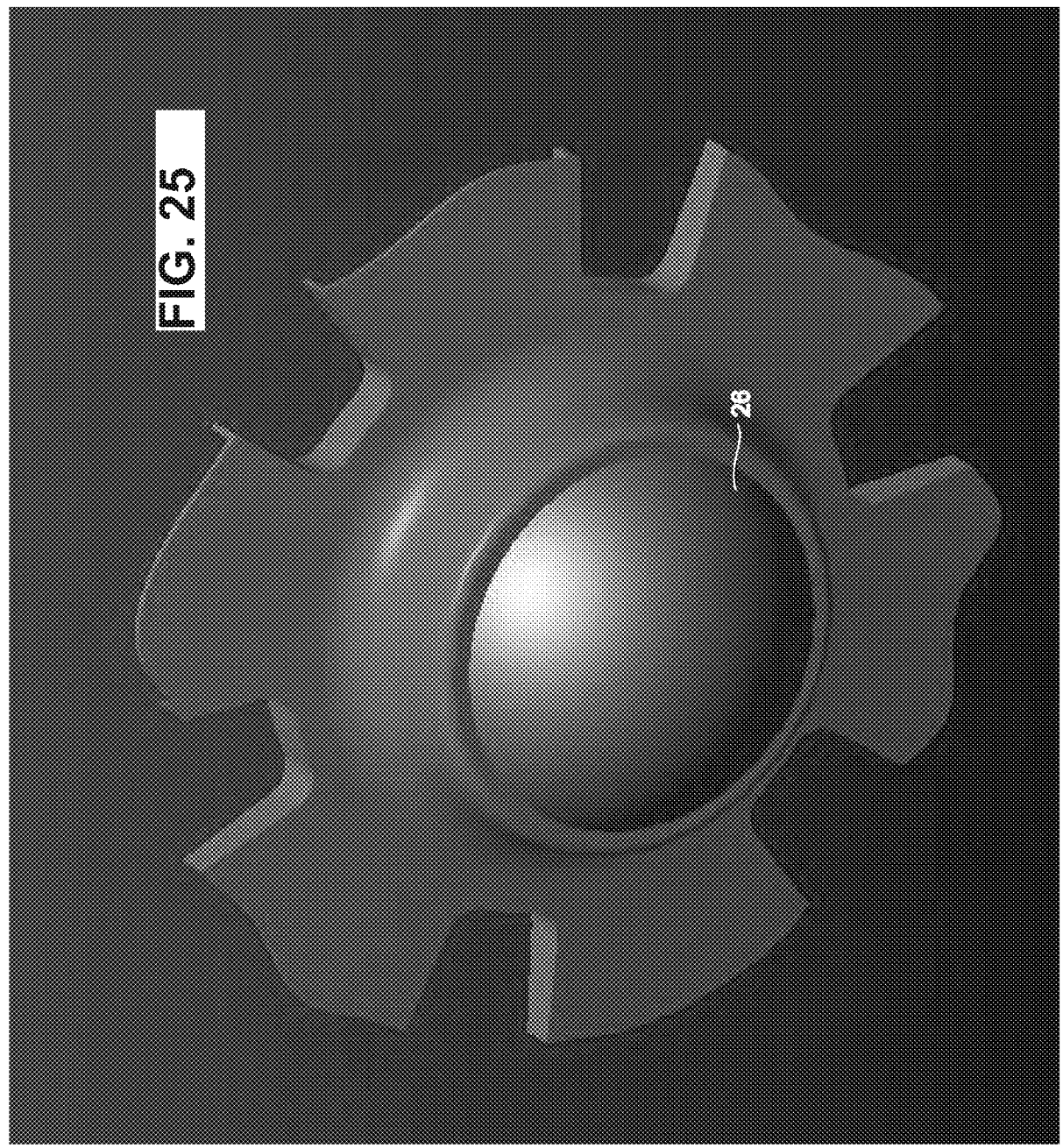

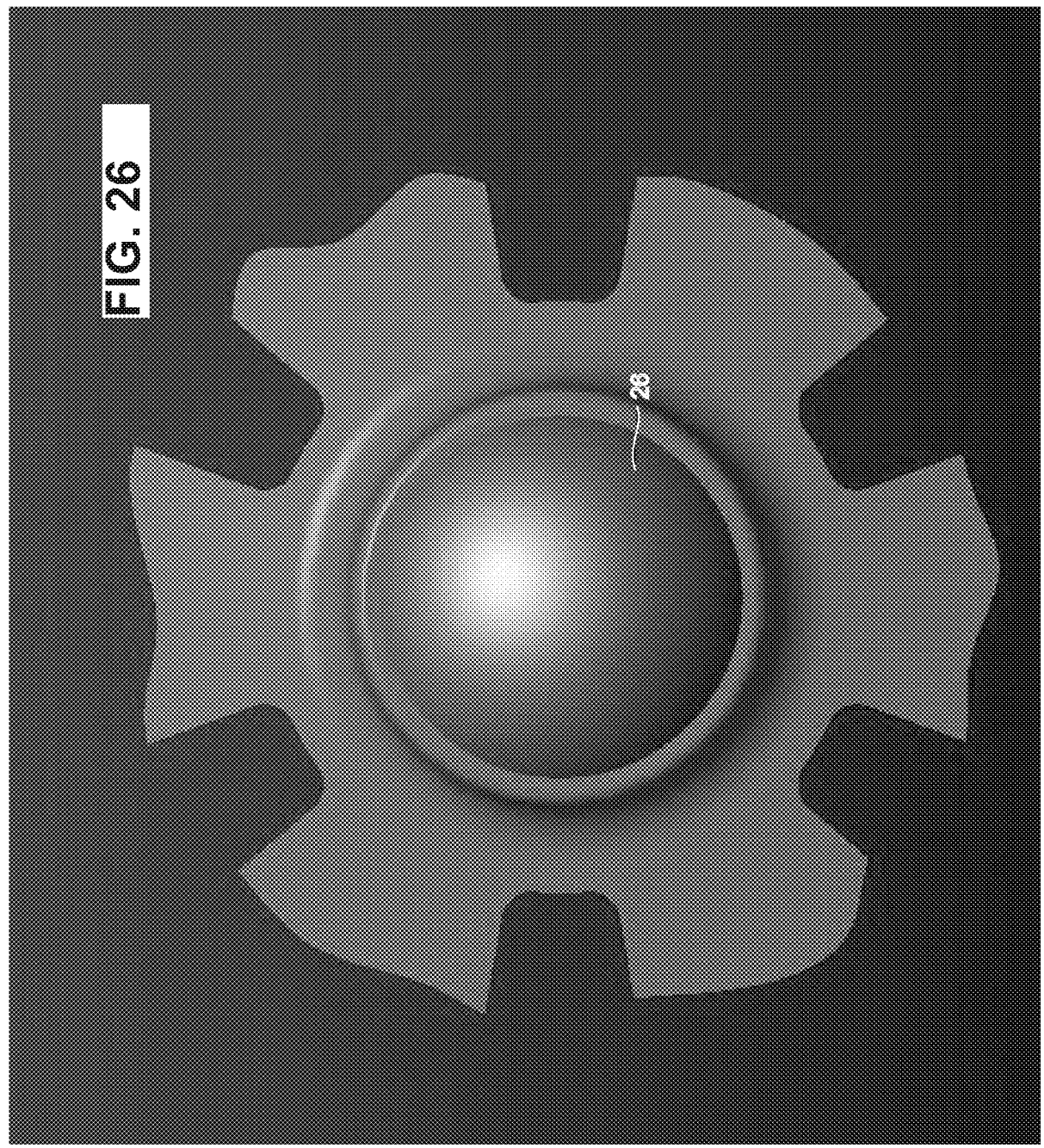

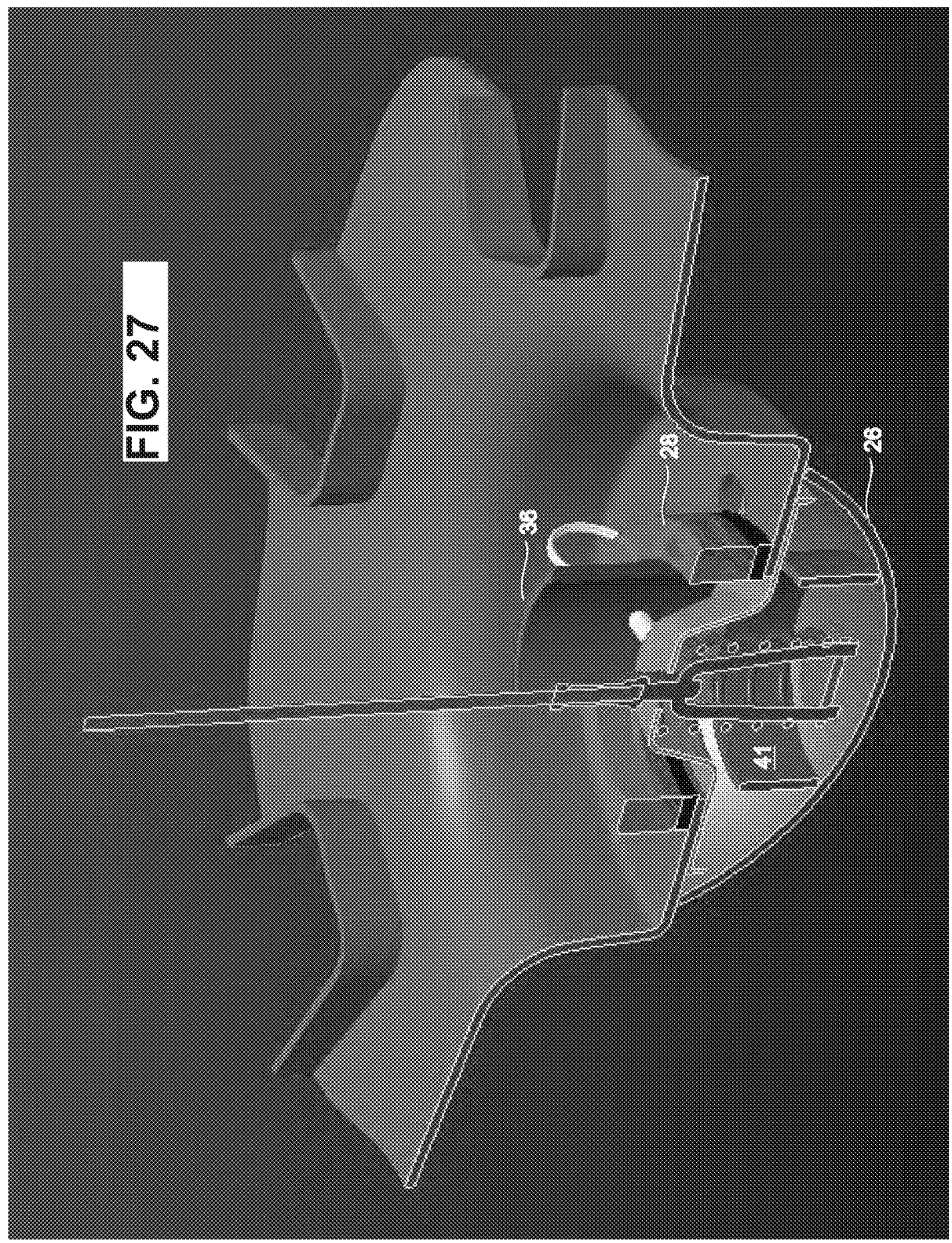

SPARE TIRE ANTI-THEFT DEVICE

CROSS-REFERENCE TO RELATED APPLICATIONS

This application claims the benefit of U.S. Provisional Patent Application No. 62/092,946 entitled "Wheel Lock Assembly" and filed on Dec. 17, 2014 which is incorporated by reference herein in its entirety.

BACKGROUND

There are numerous examples of spare tire anti-theft devices in the prior art. Many of these devices utilize a wide range of components to prevent the spare from being removed from the car by would-be thieves. Despite the use and availability of such devices, spare tire theft persists and, by many accounts, has increased.

Spare tires that are accessible from the exterior of the automobile are particularly susceptible to theft and are regularly targeted by thieves. There many types of systems used to secure spare tires to the exterior of the automobile. An example includes a cable and yoke system that secures the spare tire to the underside of the automobile carriage using a winch, cable, and yoke. When the tire is secured, the cable is often accessible through an opening in the rim of the tire. Thieves can insert cable cutters through the rim and sever the exposed portion of the cable, which thereby simultaneously separates the tire from the system and damages the system. Often times, the entire securement system needs to be replaced (winch, cable, and yoke). The vehicle owner typically incurs the cost of obtaining a new rim, tire, securement system, and labor associated with installation of each. Detrimentally, the owner typically does not notice the theft until the spare tire is needed in an emergency. In which case, the owner typically incurs the added cost of emergency service providers, such as towing.

Known devices and methods for preventing theft of spare tires lack in effectiveness, practicality, or both. For example, one inadequate solution is to chain the tire with a pad lock or combination lock to the underside of the carriage. Such a system is still susceptible to being breached by chain cutters. In addition, the locks are easily compromised by weather and other elements. Moisture, salt, and dirt can seize locks and bolts leaving the motorist unable to remove the spare tire during an emergency. Further, even if the lock is not compromised by the weather, the added inconvenience to the motorist for having to position themselves under the car to open the lock in darkness or inclement weather is undesirable.

There is a long felt need for an effective spare tire anti-theft system and method. The present disclosure details example embodiments a spare tire anti-theft system and method that offers both effective anti-theft protection and ease of access to the tire. There is also a long felt need to provide effective spare tire anti-theft protection, ease of access to the tire, and reliable access to the tire. The present disclosure describes example embodiments of a spare tire anti-theft system and method which provides effective spare tire anti-theft protection, ease of access to the tire, reliable access to the tire, in an uncomplicated and cost effective manner.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein:

FIG. 4 shows aspects of an embodiment of spare tire anti-theft device in accordance with aspects of this disclosure;

FIG. 5 shows aspects of an embodiment of spare tire anti-theft device in accordance with aspects of this disclosure;

FIG. 9 shows aspects of an embodiment of spare tire anti-theft device in accordance with aspects of this disclosure;

FIG. 10 shows aspects of an embodiment of spare tire anti-theft device in accordance with aspects of this disclosure;

FIG. 11 shows aspects of an embodiment of spare tire anti-theft device in accordance with aspects of this disclosure;

FIG. 12 shows aspects of an embodiment of spare tire anti-theft device in accordance with aspects of this disclosure;

FIG. 13 shows aspects of an embodiment of spare tire anti-theft device in accordance with aspects of this disclosure;

FIG. 25 shows aspects of an embodiment of spare tire anti-theft device in accordance with aspects of this disclosure;

FIG. 26 shows aspects of an embodiment of spare tire anti-theft device in accordance with aspects of this disclosure;

FIG. 27 shows aspects of an embodiment of spare tire anti-theft device in accordance with aspects of this disclosure;

DETAILED DESCRIPTION

Figure 1:
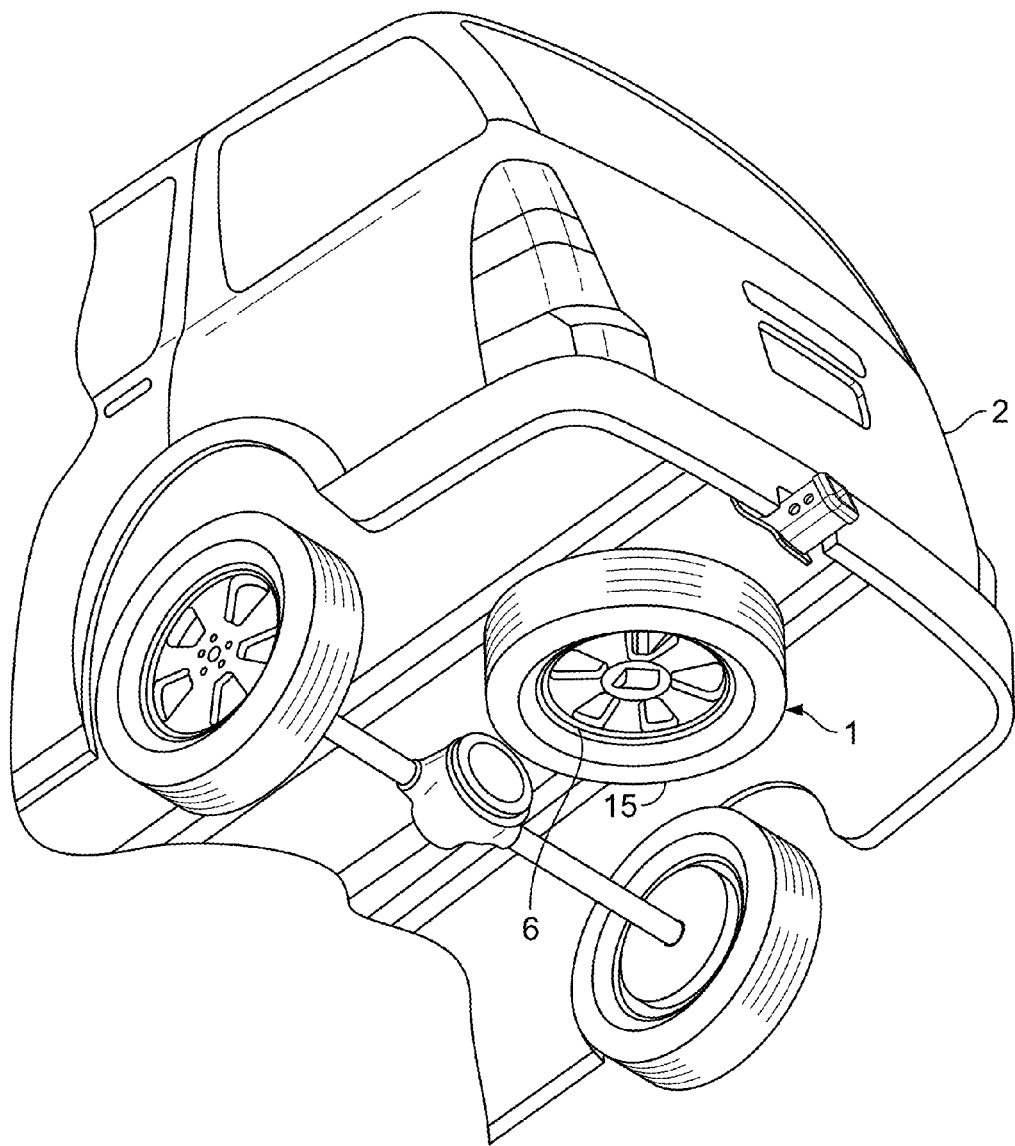
FIG. 1 depicts a bottom perspective view of the underside of a vehicle on which a spare tire is secured.

Referring to FIG. 1, example embodiments of a spare tire anti-theft device and spare tire anti-theft method described in the present disclosure are suitable for use, among other uses, to prevent theft of a spare tire secured to the underside of an automobile. An example system often used to secure a spare tire 1 to the underside of an automobile 2 includes a cable and yolk systems. Embodiments of the anti-theft device and method disclosed herein are also suitable for use to prevent theft of a spare tire secured to the underside of an automobile by systems other than a cable and yolk system.

Figure 2:
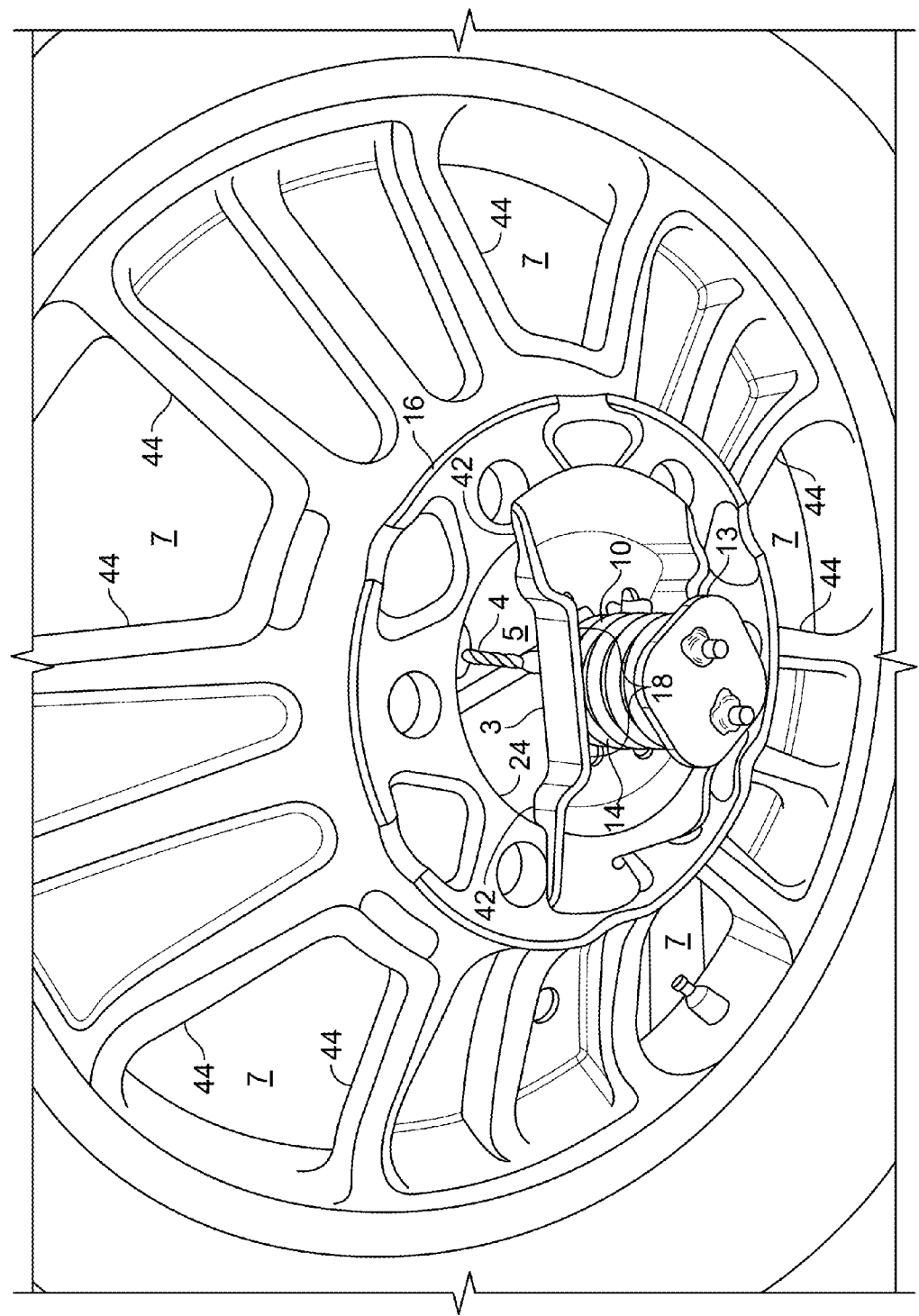
FIG. 2 depicts a bottom perspective view of a spare tire secured to the undercarriage of an automobile with a cable and yoke system.
Figure 3A:
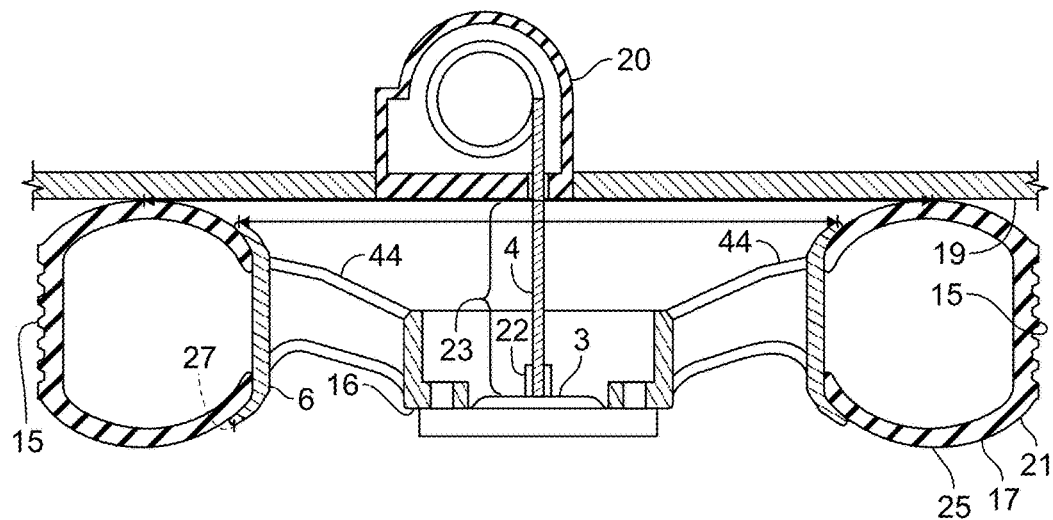
FIG. 3A depicts a cross-sectional side view of a spare tire secured to the undercarriage of an automobile with a cable and yoke system.
Figure 3B:
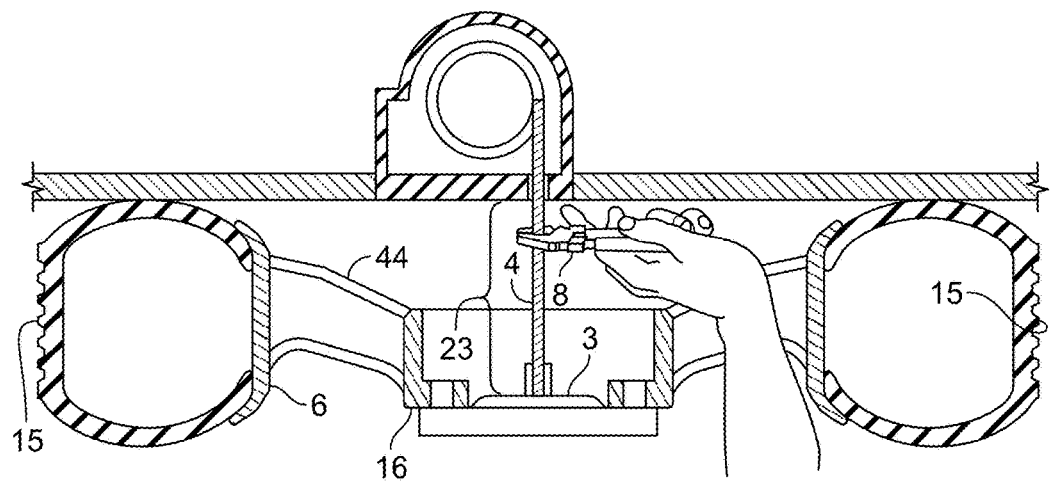
FIG. 3B depicts a cross-sectional side view of a spare tire secured to the undercarriage of an automobile with a cable and yoke system and further includes a depiction of how a would-be thief can gain access to the cable through the rim of the spare tire to sever the exposed portion of the cable with cutters.
Figure 8:
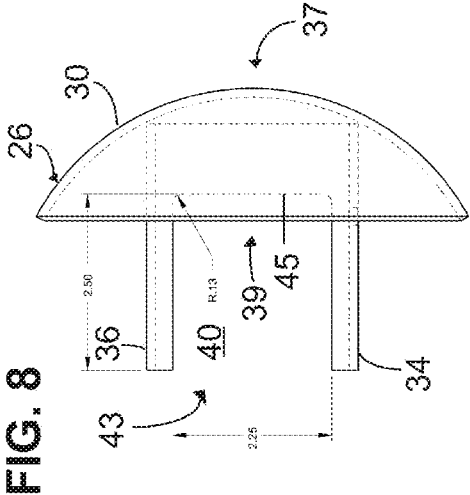
FIG. 8 shows aspects of an embodiment of spare tire anti-theft device in accordance with aspects of this disclosure.
Figure 6:
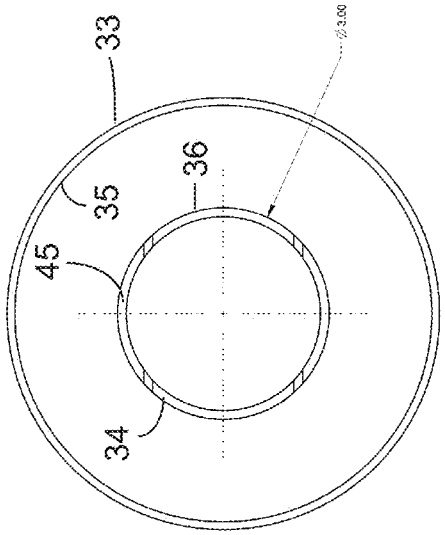
FIG. 6 shows aspects of an embodiment of spare tire anti-theft device in accordance with aspects of this disclosure.
Figure 7:
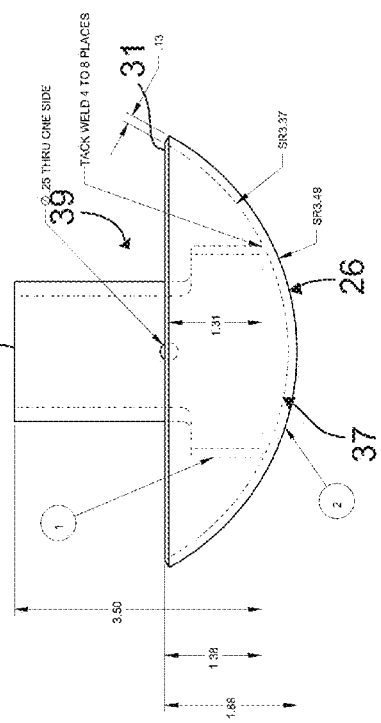
FIG. 7 shows aspects of an embodiment of spare tire anti-theft device in accordance with aspects of this disclosure.
Figure 14:
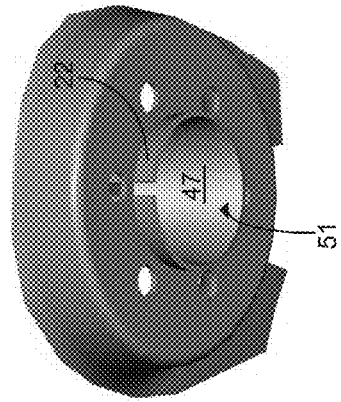
FIG. 14 shows aspects of an embodiment of spare tire anti-theft device in accordance with aspects of this disclosure.
Figure 15:
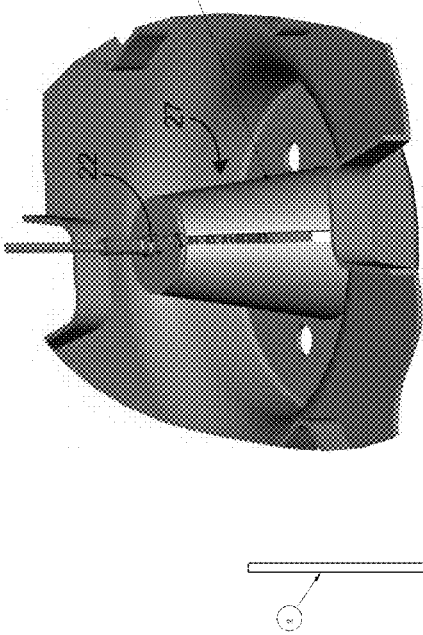
FIG. 15 shows aspects of an embodiment of spare tire anti-theft device in accordance with aspects of this disclosure.
Figure 16:
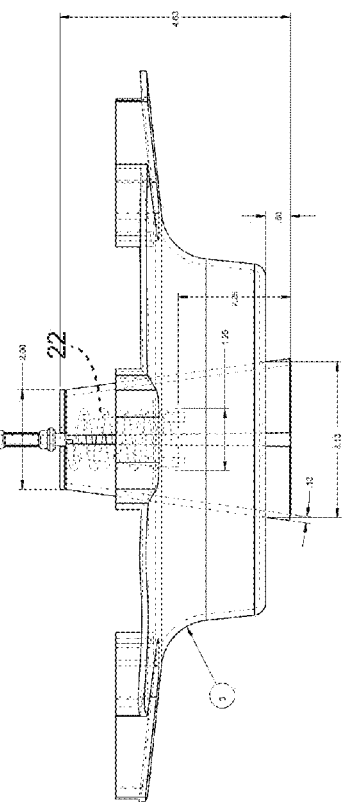
FIG. 16 shows aspects of an embodiment of spare tire anti-theft device in accordance with aspects of this disclosure.
Figure 17:
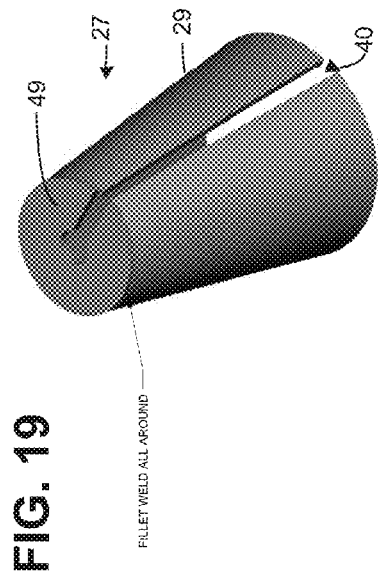
FIG. 17 shows aspects of an embodiment of spare tire anti-theft device in accordance with aspects of this disclosure.
Figure 18:
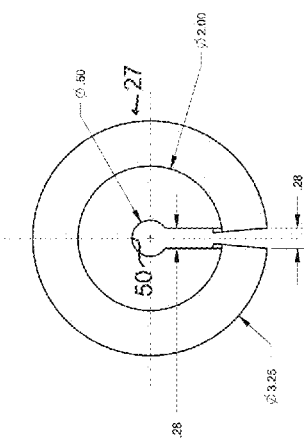
FIG. 18 shows aspects of an embodiment of spare tire anti-theft device in accordance with aspects of this disclosure.
Figure 19:
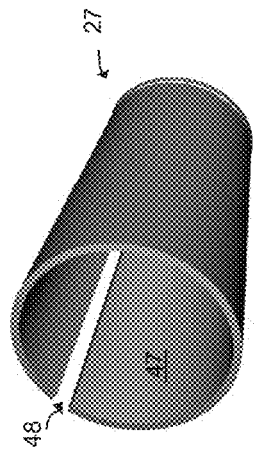
FIG. 19 shows aspects of an embodiment of spare tire anti-theft device in accordance with aspects of this disclosure.
Figure 20:
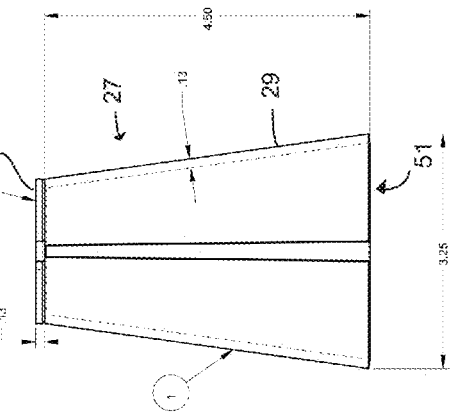
FIG. 20 shows aspects of an embodiment of spare tire anti-theft device in accordance with aspects of this disclosure.
Figure 22:
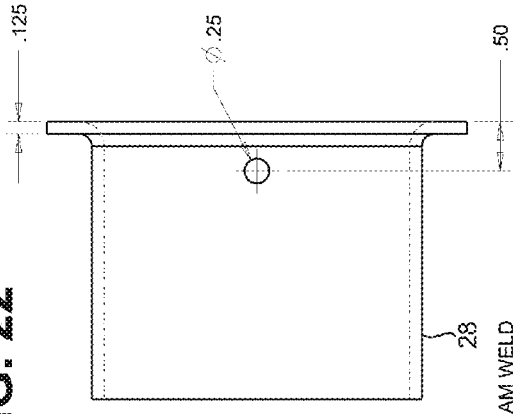
FIG. 22 shows aspects of an embodiment of spare tire anti-theft device in accordance with aspects of this disclosure.
Figure 21:
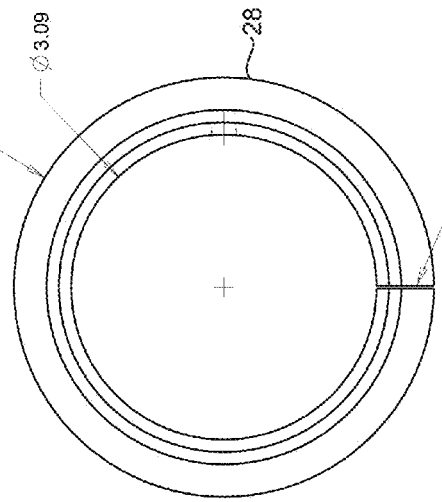
FIG. 21 shows aspects of an embodiment of spare tire anti-theft device in accordance with aspects of this disclosure.
Figure 30:
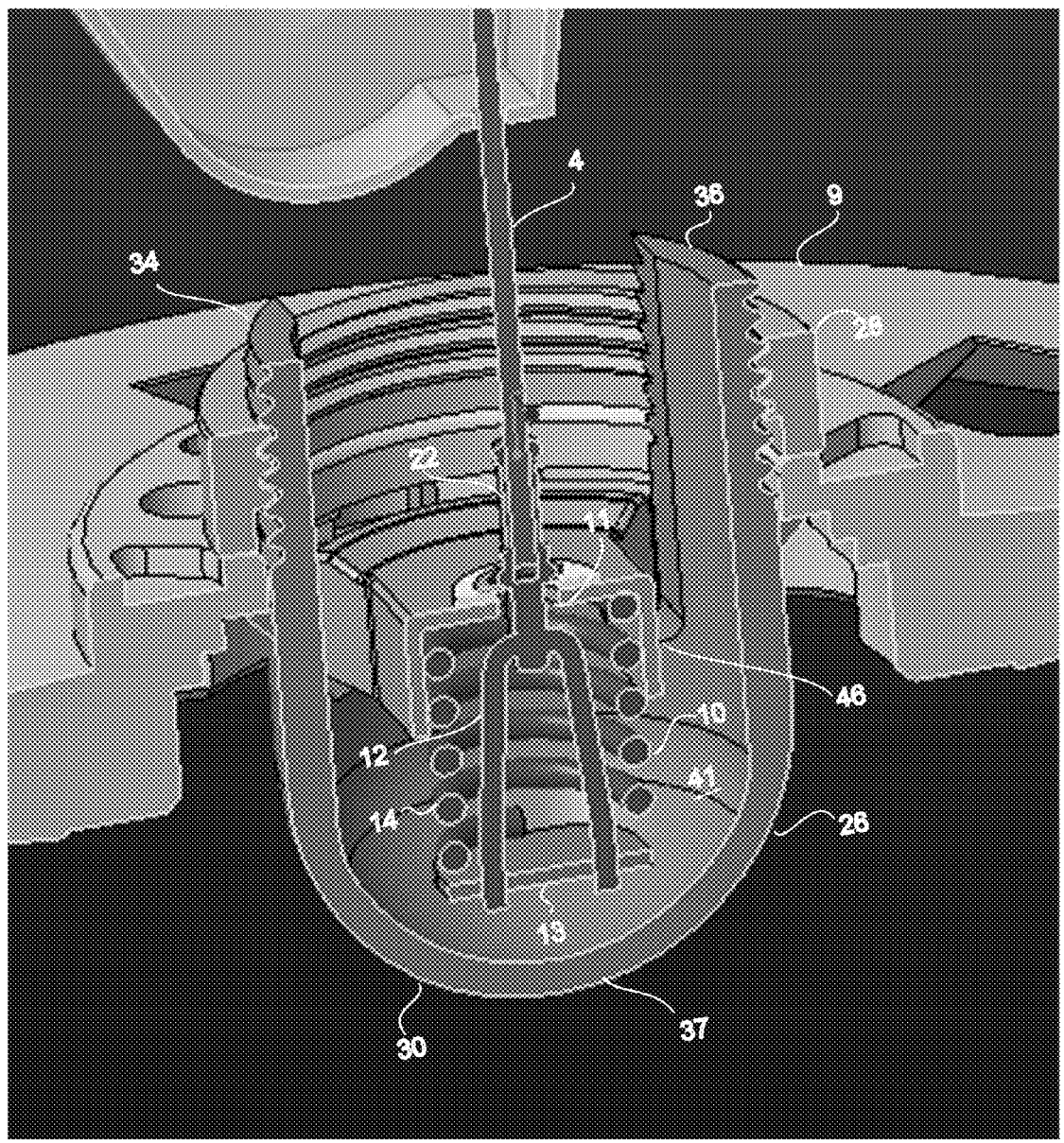
FIG. 30 shows aspects of an embodiment of spare tire anti-theft device in accordance with aspects of this disclosure.
Figure 31:
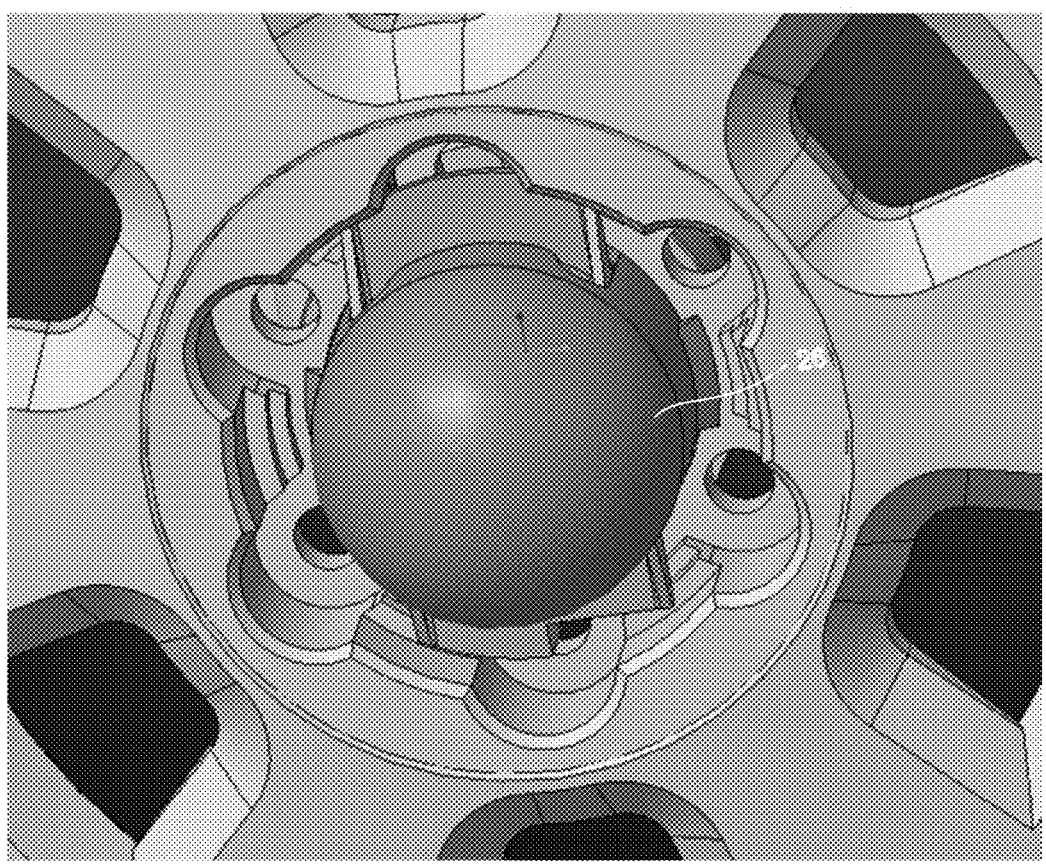
FIG. 31 shows aspects of an embodiment of spare tire anti-theft device in accordance with aspects of this disclosure.
Figure 32:
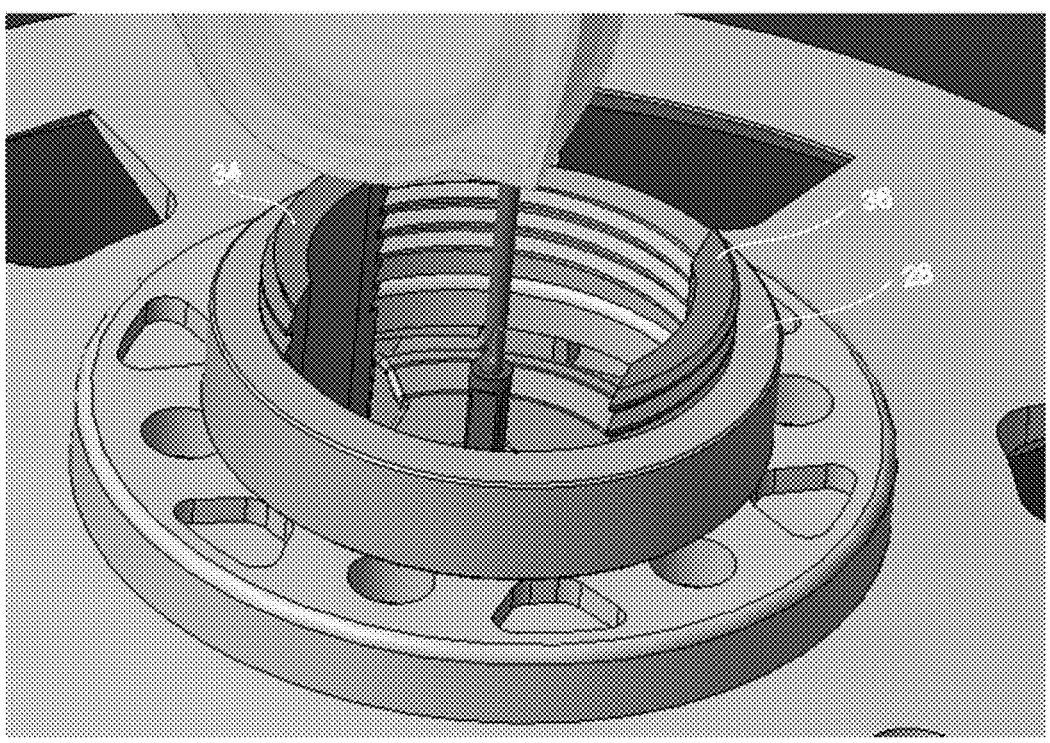
FIG. 32 shows aspects of an embodiment of spare tire anti-theft device in accordance with aspects of this disclosure.

Referring to FIGS. 2, 3A, and 3B, the spare tire 1 is secured to an underside surface 19 of a vehicle with a cable and yolk system. The spare tire 1 can include a tire 15 and rim 6. Components of cable and yoke systems can include a winch system 20, a cable 4, and a yoke 3. The yoke 3 can include yoke flanges 42 on opposing ends of the yoke and a yoke body portion 18 extending between the flanges 42. The yoke flanges are configured to engage the hub 16 of the rim 6 in securing the tire to the underside of the vehicle. Various types of winch systems are known in the art for extending or retracting the cable 4. The winch 20 can be secured to the undercarriage of the automobile and can be considered part of the undercarriage and form at least part of an underside surface 19 of the automobile. FIGS. 3A and 3B depict an example of the winch housing 20 forming part of the underside surface 19 of the automobile. The proximal end of the cable 4 is secured to the automobile at, for example, the winch 20. The yoke 3 is attached to the distal end of the cable 4. The distal end of the cable 4 often includes some type of cable coupling 22 to facilitate connecting the cable 4 to the yoke 3 and prevent the cable from fraying. For purposes of this disclosure, the cable coupling 22 can be considered part of the cable. A variety of cable coupling structures and methods are used to connect the cable 4 to the yoke 3, including various clamps, crimping devices, locks, fittings, screws, bolts, and more. In one example, as shown in FIG. 30, the cable coupling 22 is secured to the distal end of the cable 4 and includes an extension and spring assembly 10, where the extension 12 is configured to extend through an aperture 11 of the yoke 3 and the spring 14 is configured to engage the underside of the yoke 3 when the winch drawn upward to secure the tire to the underside of the vehicle. The extension and spring assembly 10 can include a bottom plate 13 configured to secure the spring 14 in the assembly and keep the spring in position as the winch is draws the spring in biasing contact with the underside of the yoke.

To secure a spare tire to the underside surface 19 using a cable and yoke system, the cable is first drawn from the winch to extend the length of uncoiled cable and provide slack. Next, the yoke is inserted through the center bore of the hub 16 of the rim 6 of the spare tire 1 and positioned against the back side of the hub. The yoke and spare tire is drawn toward the underside of the automobile by, for example, cranking or winding the winch to draw the cable into the winch. The spare tire is secured against the underside surface 19 of the automobile by the tire or rim coming in contact with a portion of the underside surface 19 and the winch system holding the position of the cable taught to maintain such contact. Some systems use a chain in place of a cable 4 to perform the function of the cable.

Cable and yolk systems typically permit access to the cable 4 through multiple openings while the spare tire is secured to the underside of the automobile. For example, space between the yoke 3 and inside surface of the center bore 24 of the hub 16 of the rim 6 defines an opening 5 through which the cable 4 can be reached. In addition, spaces between spokes 44 of the rim 6 can provide openings 7 through which the cable 4 can be reached. Other openings through which the cable can be reached can be created by the various sizes and shapes of tires, rims, and the undercarriage, and the manner and orientation in which the tires and rims are secured to the undercarriage. For example, any space between the tire and the underside surface of the automobile can create such an opening.

Referring to FIG. 3B, a thief can reach the cable 4 with cutting device 8 through, for example, an opening 7 and use the cutting device 8 to sever the cable 4 and thereby release the spare tire 1 from the undercarriage. A thief can also reach the cable 4 with a cutting device through the opening 5 created by the space between the yoke 3 and the inside surface 24 of the center bore of the hub 16 of the rim 6. The length of cable susceptible to being severed as described above typically includes any portion of the cable that extends between the underside surface of the automobile and the yoke and can include portion of the cable that extends beyond the yolk. Such a portion or portions of the cable can be referred to as the exposed cable. An example of a length of exposed cable is identified with reference number 23 in FIG. 3A. The cutting device 8 can include any cutting device generally used in the art to cut cable, chains, and like sized metal components typically used in cable and yoke systems. However, in most circumstances, thieves are limited to cutting devices that can fit easily and quickly in the tight spaces above the rim and the space below underside of the automobile and the road, such devices often include compact jaws and handles. The smaller cutting devices are also preferred by thieves as being more easily concealable than their larger counterparts. The smaller cutting devices, however, reduce the thieves' capability of cutting through larger diameter pieces and harder pieces.

In addition, a thief can use a leveraging device to pry the cable coupling 22 off the cable 4. For example, a crowbar can be used to engage the extension and spring assembly 10 of the cable coupling 22 and sever the coupling 22 from the cable 4 to thereby release the yoke from the cable and thereby release the tire from being secured to the underside of the vehicle by the cable and yoke. Accordingly, the portion of the cable coupling extending from the underside of the yoke, including an extension and spring assembly, can be a vulnerable aspect of a cable and yoke securement system that can be targeted by thieves.

Referring to FIGS. 4 through 32, multiple example embodiments of a spare tire anti-theft device and components thereof are shown. In an embodiment, the device 9 includes a cap 26 and retainer 28 assembly. The cap 26 can be configured to cover a portion of the yoke 3 and the cable coupling 22 extending from the underside of the yoke, including for example an extension and spring assembly. The cap can be secured in place by engaging the cap retainer 28 positioned on the opposite side of the hub 16 of the rim 6.

In an embodiment, the cap includes a cover portion 30. The cover portion can be configured to cover a portion of the yoke and the cable coupling extending from the underside of the yoke. The cover portion 30 can include an outer wall 31 having an outside surface 33, an inside surface 35, a closed bottom end 37, and an open top end 39. A cavity 41 is defined in the open top end 39. The cavity 41 can be configured to enclose at least a portion of the yoke and cable system, including the yoke body 18 and/or the cable coupling extending below the yoke.

The cap 26 can include a first stanchion and a second stanchion extending upwardly from the open top end 39. The first and second stanchions can be positioned opposite each other and can be spaced from each other such that a body 18 of the yoke 3 can be positioned between the first and second stanchions, as shown by example in FIG. 30. In an embodiment, the stanchions 34, 36 define a pair of opposing slots between the stanchions. Each slot 40 includes an open slot end 43 and a closed slot end 45. In an embodiment, the closed slot end 45 is defined by a top edge 46 of the outer wall 31 at the open top end 39, such as shown by example in FIG. 30. The slots can be configured to have the body 18 of the yoke 3 fit within the slots 40. In addition, the first and second stanchions can be configured such that the stanchions fit between and extend through openings 5 defined between opposite sides of the body 18 of the yoke and the inside surface of the center bore 24 of the hub 16 of a rim 6 of the spare tire 1. In addition, in an embodiment, the stanchions can be configured to include a curved outer surface configured to conform to a curved inner surface of the center bore of the hub such as shown by example in FIG. 30. In addition, in an example, the stanchions are configured substantially parallel relationship with one another.

To install the cap 26, the cover portion 30 is placed to position the cable coupling extending below the yoke into the cavity 41 of the cover portion and the first and second stanchions are each positioned though an opening defined between each side of the body of the yoke and the inside surface of the center bore of the hub. The cap retainer is then positioned on the opposite side of the hub from the closed bottom end of the cover portion and secured to at least one of the first and second stanchion to hold the device 9 in place.

In an embodiment, the first and second stanchion include male threads on the outside surface of the stanchions and the cap retainer includes female threads on an inside surface of the stanchion to thereby allow the stanchions and the cap retainer to be threadedly engaged. In an embodiment, at least one of the stanchions and the cap retainer include holes defied therein that can be aligned and accept a pin therethrough to secure the cap retainer to the cap, such as shown by example in FIGS. 5 and 7. In an embodiment, the stanchions are connected to the inner surface of the cover portion, including in an example shown in FIGS. 6 through 8 where a ring is secured in the cavity of the cover and the stanchions extend upwardly from the ring. In an embodiment, the stanchions are connected to the cover portion at the open top end, such as shown by example in FIGS. 29 and 30.

Figure 24:
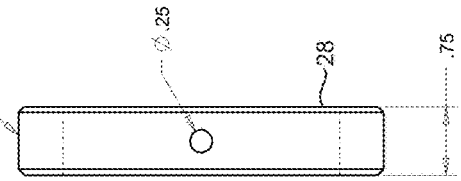
FIG. 24 shows aspects of an embodiment of spare tire anti-theft device in accordance with aspects of this disclosure.
Figure 23:
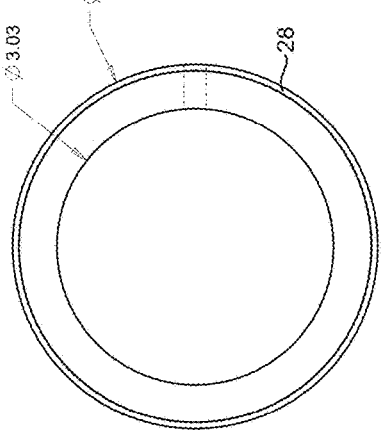
FIG. 23 shows aspects of an embodiment of spare tire anti-theft device in accordance with aspects of this disclosure.
Figure 28:
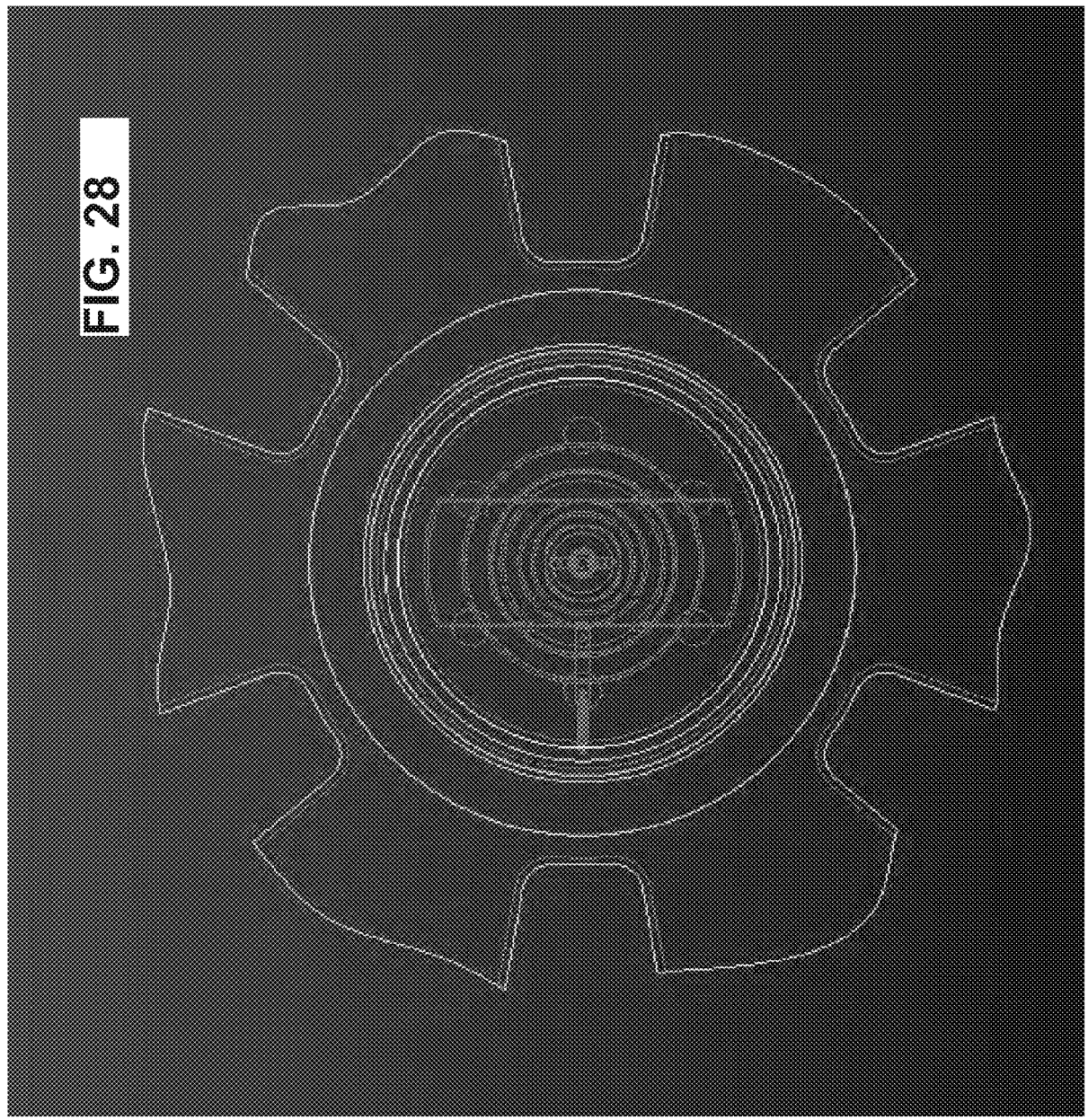
FIG. 28 shows aspects of an embodiment of spare tire anti-theft device in accordance with aspects of this disclosure.
Figure 29:
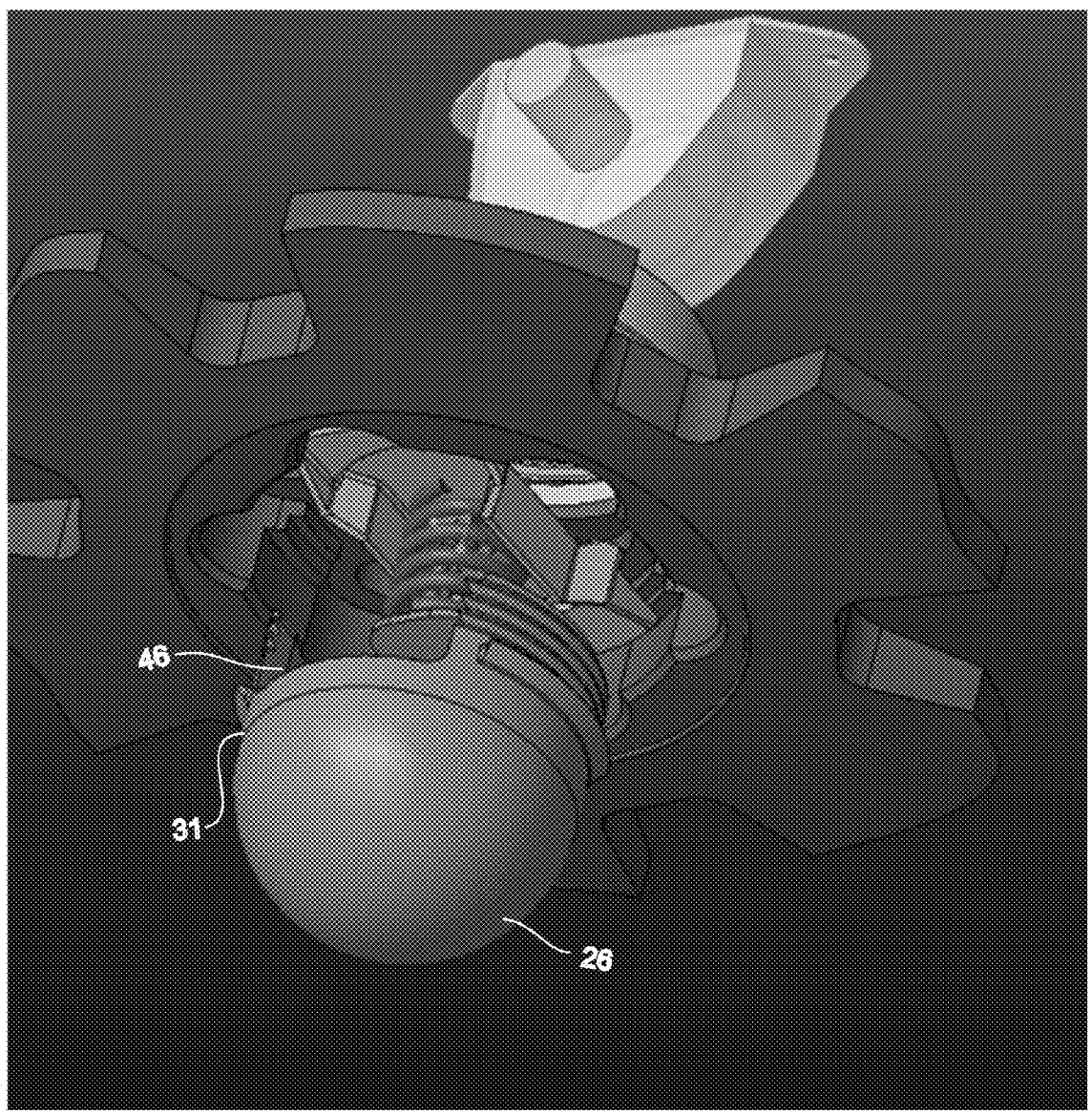
FIG. 29 shows aspects of an embodiment of spare tire anti-theft device in accordance with aspects of this disclosure.

In an embodiment, the cap retainer is configured in the form of a ring, such as shown by example in FIGS. 5, 23, and 24. In an embodiment, the cap retainer 28 is configured in the form of a cylinder, such as shown by example in FIGS. 10, 21, and 22. In an embodiment, the cap retainer encircles at least a portion of the cable extending between the yoke and the underside of the vehicle, such as shown by example in FIGS. 5, 10, and 21 through 24. In an embodiment, the cap 26 can be a unitary piece, including the stanchions in the unitary piece such as shown by example in FIGS. 29 and 30. In an embodiment, the cover portion is generally hemispherical in shape, such as shown by example in FIGS. 7, 8, 29, and 30. In an embodiment, the cover portion is generally box shaped. In an embodiment, the cover portion is generally shaped like a cylindrical bottle cap, such as shown by example in FIGS. 11 through 13. The device 9 can be constructed of, for example, steel or rigid plastic rigid material.

Referring to FIGS. 14 through 20, an embodiment of a spare tire anti-theft device 27 is shown. The device 27 includes a conical wall 29 configured to cover all or a portion of the cable coupling 22. The device 27 allows the cable coupling 22 to be drawn into the interior 47 of the device such that the cable coupling is not exposed below the hub of the rim when the tire is secured to the underside of the automobile, such as shown by example in FIG. 14. The conical wall 29 can include a wall slot 48 defined therein through which the device can be inserted over the cable 4 and then slide down the cable to enclose the cable coupling 22. In an embodiment, the proximal closed end 49 of the conical wall includes a wall slot end 50 that mates with a portion of the cable coupling 22. The distal open end 51 of the conical wall has a diameter greater than the inner diameter of the bore such that as the cable, cable coupling 22, and device 27 are drawn into the winch, the distal open end 51 of the device will engage the inner surface 24 of the center bore and allow the tire to be lifted and drawn toward the underside of the vehicle and be secured to the underside of the vehicle. The device 27 inhibits exposure of the cable coupling 22 to cutting and leveraging implements due to the small space within the interior 47 of the device and its position within the rim of the time. The device 27 can be constructed of, for example, steel or rigid plastic or other suitable rigid material.

The devices of the instant disclosure overcomes the disadvantages of the prior art and accomplishes the surprising result of a combination of effective anti-theft protection, theft deterrent, ease of access to the spare tire, reliable access to the spare tire, in an uncomplicated and cost effective manner. The anti-theft effectiveness of the devices disclosed herein are exhibited by that, for example, a great majority of the cutting devices or leveraging devices used to sever cables of cable and yoke systems are rendered useless for such purpose. The devices of the instant disclosure provides effective anti-theft protection while providing ease of access to the spare tire. The device provides effective anti-theft protection and reliable access to the spare as, for example, the device is generally unaffected by the elements. The devices provide effective anti-theft protection in an easy to use, cost-effective manner in that, for example, the device can consist of one piece or several easily assemble pieces. The combination of anti-theft effectiveness and the aforementioned advantages are surprising and, in addition, solve a long-felt need for a solution where many others have failed to achieve such combination.

The reader should understand that these specific examples are set forth merely to illustrate examples of the device, and they should not be construed as limiting. Many variations may be made from the specific structures described above without departing from this disclosure.

What is claimed is:

1. An automobile spare tire anti-theft device comprising:
   a cap comprising a cover portion, a first stanchion, and a second stanchion; and
   a cap retainer;
   wherein the cover portion includes an outer wall having an outside surface and an inside surface, a closed bottom end, and an open top end,
   wherein a cavity is defined in the open top end, the cavity is configured to enclose at least a portion of a yoke and cable system for securing a spare tire to an underside of a vehicle, such that at least a portion of the yoke and a cable coupling extending below the yoke are covered by the cover portion when the cover portion is placed to position the cable coupling extending below the yoke into the cavity;
   wherein the first and second stanchions extend upwardly from the open top end, and wherein the first and second stanchions are positioned opposite each other and are spaced from each other such that a body of the yoke can be positioned between the first and second stanchion;
   wherein when the cover portion is placed to position the cable coupling extending below the yoke into the cavity, the first and second stanchions are configured to extend through openings defined between opposite sides of the body of the yoke and an inside surface of a center bore of a hub of a rim of the spare tire; and
   wherein at least one of the first stanchion and the second stanchion is configured to engage the cap retainer, wherein the cap retainer is positioned on an opposite side of the hub from the closed bottom end.

2. The device of claim 1, wherein the cap is a unitary piece.

3. The device of claim 1, wherein at least one of the first stanchion and the second stanchion threadedly engage the cap retainer.

4. The device of claim 1, wherein at least one of the first stanchion and the second stanchion and the cap retainer are configured to be engaged with a pin through aligned holes defined in at least one of the first stanchion and the second stanchion and the cap retainer.

5. The device of claim 1, wherein the cap retainer is a ring.

6. The device of claim 1, wherein the cap retainer is a cylinder.

7. The device of claim 1, wherein the first and second stanchions are connected to the inner surface of the cover portion.

8. The device of claim 1, wherein the first and second stanchion are connected to the cover portion at the open top end.

9. The device of claim 8, wherein the first and second stanchion define a pair of opposing slots between the first and second stanchions, wherein each slot includes an open slot end and a closed slot end, wherein each of the closed slot end is defined by a top edge of the outer wall at the open top end, wherein the slots are configured to have a body of the yoke fit within the slots.

10. The device of claim 1, wherein the first stanchion and the second stanchion include a curved outer surface configured to conform to a curved inner surface of the center bore of the hub.

11. The device of claim 1, wherein the first stanchion and the second stanchion are substantially parallel.

12. The device of claim 1, wherein the cover portion is generally hemispherical in shape.

13. The device of claim 1, wherein the cover portion is generally box shaped.

14. The device of claim 1, wherein the cap retainer encircles at least a portion of the cable extending between the yoke and the underside of the vehicle.

* * * * *